Oct. 8, 1968  P. V. GOEDERTIER  3,405,044
METHOD OF MAKING HIGH PURITY METAL ZEOLITE AND PRODUCT THEREOF
Filed Aug. 19, 1964

INVENTOR.
PETER V. GOEDERTIER
BY J. R. Webb
AGENT

United States Patent Office 3,405,044
Patented Oct. 8, 1968

3,405,044
METHOD OF MAKING HIGH PURITY METAL ZEOLITE AND PRODUCT THEREOF
Peter V. Goedertier, Princeton, N.J., assignor to Radio Corporation of America, a corporation of Delaware
Filed Aug. 19, 1964, Ser. No. 390,628
14 Claims. (Cl. 204—130)

ABSTRACT OF THE DISCLOSURE

A high purity metal zeolite is made by heating a body of sintered zeolite, e.g. sodium zeolite type A, at a temperature of 1000 to 1200° C. in a vacuum for a time sufficient to remove substantially all of the mobile cations from the body by thermionic emission, and then injecting sufficient ions of a metal selected from groups I and II of the Periodic Table into the body to replace substantially all of the cations removed therefrom, as by a process of electrolytic migration of ions of the selected metal from a molten salt of that metal. In an example wherein substantially all of the sodium cations in sodium zeolite type A, $Na_{12}(AlO_2)_{12}(SiO_2)_{12}$, are replaced by cesium ions, the resulting zeolite is $Cs_{12}(AlO_2)_{12}(SiO_2)_{12}$, which is substantially free of sodium impurities and has an ion capacity for thermionic ion emission of about $10^{22}$ ions/cm.$^3$.

---

The present invention relates to a new and improved thermionic ion emitter and a novel method of making the same.

A high capacity source of gas or vapor ions is required for gas or vapor discharge devices such as thermionic energy converters, high density electron guns and ion propulsion systems. Although the ions can be created by electron bombardment of gas or vapor atoms, or by contact ionization of relatively low ionization potential vapors at a hot metal surface of high work function, it is preferable to supply the ions directly by thermionic emission from a thermionic ion source. The lithium alumina silicate, β-eucryptite, that is, $Li_2O.Al_2O_3.2SiO_2$, is a good thermionic emitter of lithium ions. This material can be synthesized by a process involving heating $Li_2CO_3$, $Al(NO_3)_3.9H_2O$, and pure quartz ($SiO_2$) together at about 1400° C. This method involves replacing some of the silicon ions in the quartz lattice with aluminum ions and "stuffing" the lattice with sufficient monovalent lithium ions to make up for the difference in valence between aluminum (3) and silicon (4), to produce a stable compound of aluminum, lithium and silicon ions with the associated oxygen ions in the lattice. Attempts to duplicate this process with quartz, an aluminum compound and a compound containing either cesium, potassium or rubidium, to make similar thermionic emitters of cesium, potassium or rubidium ions, have been unsuccessful. As explained by M. J. Buerger, in a paper entitled "The Stuffed Derivatives of the Silica Structures," American Mineralogist 39, 600 (1954), the voids in quartz are too small to permit stuffing with $Na^+$ or larger ions, but are large enough for $Li^+$ or $Be^+$. The ionic radii of some of the metals of interest are shown in the following table:

| Metal | Valence | Ionic Radius (A.) |
|---|---|---|
| Be | ++ | .31 |
| Li | + | .60 |
| Mg | ++ | .65 |
| Na | + | .95 |
| K | + | 1.33 |
| Rb | + | 1.48 |
| Cs | + | 1.69 |

Another possibility for producing a thermionic emitter of cesium, rubidium or potassium ions is the substitution of $Cs^+$ ions for $Na^+$ ions in sodium zeolite, by a chemical ion exchange process, as described in a paper by D. W. Breck et al. entitled "Crystalline Zeolites. I. The Properties of a New Synthetic Zeolite, Type A," Journal of the American Chemical Society, 78, 5963 (1956). Zeolite crystals are built up of tetrahedral units, each having oxygen ions at the corners. These tetrahedra are linked together with all four oxygen ions shared with the neighboring tetrahedra, to form a cross-linked negatively charged network. Channels 4–6 A. in diameter run through this network and between them lie cations of sodium, for example. These cations can move into one channel or the other, along which they diffuse outwards to the ambient solution, while the corresponding cation from the solution diffuses into the solid in equivalent amounts to preserve electroneutrality and to complete the ion exchange. The channels themselves are ordinarily filled with water molecules, but these can be driven off with heat. The chemical ion exchange process is only partially successful, in that less than half of the $Na^+$ ions can be replaced by $Cs^+$, $K^+$, or $Rb^+$ ions, as shown by Table VII, page 5968 of the Breck et al. paper. As a result, a zeolite made by this process with cesium, for example, contains more $Na^+$ than $Cs^+$ ions, and hence, when used as a thermionic ion emitter, emits $Na^+$ as well as $Cs^+$ ions, which is usually undesirable.

An object of the present invention is to produce an improved thermionic ion emitter.

Another object of the invention is to produce a thermionic emitter of substantially cesium ions only.

A further object is to provide a novel method of making a thermionic ion emitter.

In accordance with the present invention, a body of zeolite is heated in an ion acceleration electric field to removal all, or substantially all, of the mobile cations from the zeolite lattice by thermionic emission, and then cesium ions, for example, are injected into the lattice to replace substantially all of the cations removed, by a process of electrolytic ion migration from a molten salt such as cesium tri-iodide. The form of zeolite used is preferably synthetic sodium zeolite type A which has a crystalline form represented by the formula

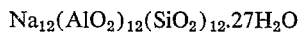

as described in the Breck et al. paper. When sodium zeolite A is used, the process produces a very pure synthetic cesium zeolite represented by the formula

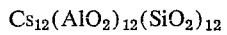

which has a thermionic ion emission capacity equal to or better than that of β-eucryptite, with a very low emission of neutrals or other ions. Measurements indicate that this new cesium ion emitter yields about $1.2 \times 10^{22}$ cesium ions per cm.$^3$ of the emitter material.

Each of the metals in the 1st and 2nd groups of the Periodic Table, except francium, has an ionic radius less than that of cesium, and the ionic radius of francium is 1.76 A, which is only slightly larger than that of cesium. Therefore, in view of the ion exchange relations described on page 5968 of the Breck et al. paper, it is apparent that the process of the present invention can be used with any of the metals of the 1st and 2nd group, by similarly replacing the sodium ions in sodium zeolite by the desired metal ion to form the desired metal zeolite.

The thermionic ion emitter of the present invention is prepared from one of the natural or synthetic zeolites. The cations in the zeolites are not permanently anchored to stable sites, but instead, move around jumping from site to site, and even evaporating from the surface. These effects are strongly enhanced by a rise in temperature. These materials have exceptionally high ion densities, of the order $10^{22}/cm.^3$ Hence, when coated to an appropriate heater substrate, they should constitute rich ion sources. However, the metal ion species emitted are limited to the cation species in the framework or lattice. These are usually Na, Ca or Ba, or a mixure of these elements.

Figure 1:
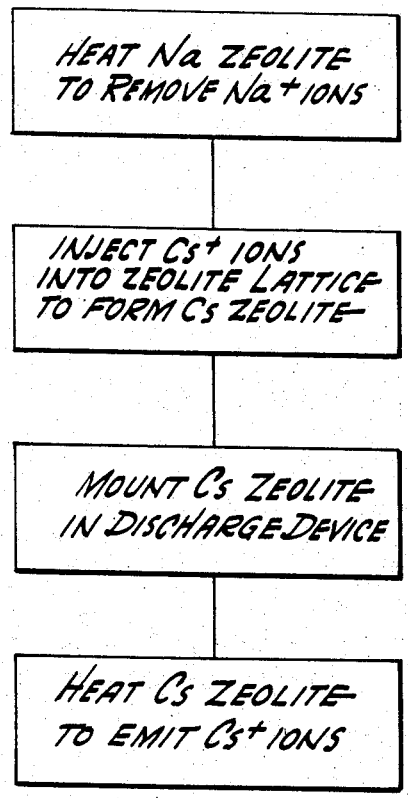
FIG. 1 is a flow chart for the method of the present invention.

The general process of making and using the ion source is outlined by the flow chart constituting FIG. 1. For example, in order to produce a cesium ion source consisting essentially of cesium zeolite, a commercially available zeolite known as sodium zeolite type A is depleted of its $Na^+$ ions by thermionic emission, and then the desired cesium ions are injected into the depleted zeolite lattice to fill the ion vacancies, using a process of electrolytic migration of cesium ions from a molten cesium salt. The zeolite may then be mounted and tested.

A cesium zeolite ion source was made by the following method. First, a mixture of about 40 grams of powdered sodium zeolite type A with a nitrocellulose binder was placed in a platinum crucible and heated to about 1600° C. to convert the powder into a glass. After cooling, the glass was broken into chips for use in making the ion emitter.

Figure 2:
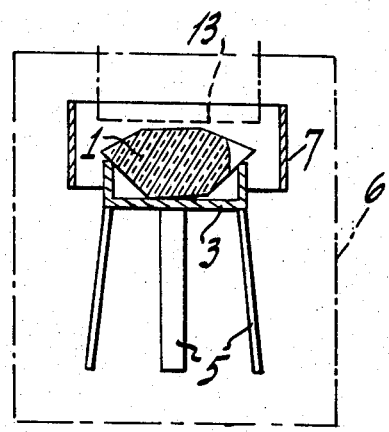
FIG. 2 is a side view partly in section of an arrangement for removing $Na^+$ ions from a sodium zeolite body.
Figure 3:
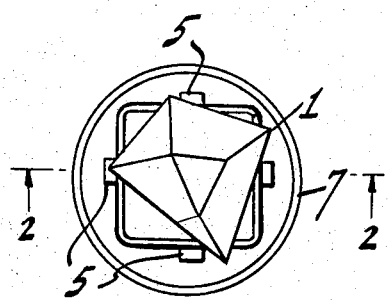
FIG. 3 is a top view of the arrangement of FIG. 2.

Referring to FIGS. 2 and 3, a chip 1 of the zeolite glass was then placed in a tungsten-clad platinum cup 3 of .1″ x .1″ x .05″ dimensions. The cup 3 was heated by a cross type four-leg heater 5 to about 1600° C. in a vacuum system 6 to sinter the chip 1 into a fused mass 1a. The chip 1 was so chosen that after sintering the mass 1a projected upwardly appreciable beyond the rim of the cup 3. Heat was applied until the lower portion of the chip 1 melted and fused to the cup 3, with the chip 1 settling into the cup. During this sintering process, the upper portion of the chip 1 was not melted completely, but was merely softened somewhat into a generally convex shape. An annular collector 7 of stainless steel, .150″ in diameter, was mounted around the cup 3, as shown, and biased negatively with respect to the cup 3 to attract the positive sodium ions thereto.

The fused zeolite mass 1a was then depleted of its sodium ions by thermionic emission at about 1075° C., yielding ionic currents of density about .8 ma./cm.$^2$. This is the first step in FIG. 1. From the current integrated over time, the capacity of the zeolite was estimated to be about $10^{22}$ $Na^+$ ions per cm.$^3$ From structural and density data, it was estimated that substantially all the $Na^+$ ions originally present in the zeolite mass 1a had been removed.

The cesium salt used in the process of injecting cesium ions into the zeolite lattice was cesium tri-iodide, $CsI_3$. Since this material was not available in sufficiently pure form, it was synthesized as follows. 20.4 grams of iodine were mixed with about 200 cc. of water and heated to 95° C. until completely dissolved. Then, 20.75 grams of CsI were added, while stirring. The dark purple solution, after cooling, yielded about 12 grams of $CsI_3$ in crystalline form.

Figure 4:
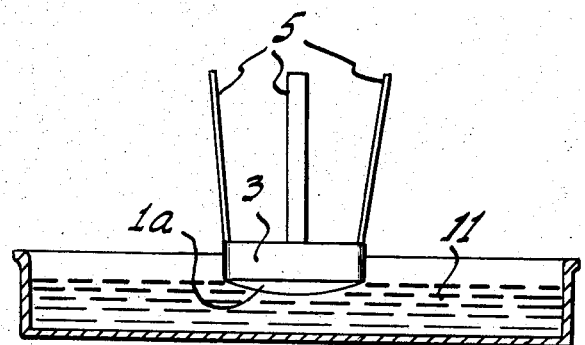
FIG. 4 is a side view partly in section of an arrangement for injecting metal ions into the zeolite body of FIG. 2 after the removal of the $Na^+$ ions.

The $CsI_3$ crystals were placed in a stainless steel cup 9, FIG. 4, of ½″ diameter and ⅛″ depth, and melted in an oven at about 207° C. The $Na^+$ depleted zeolite mass 1a was removed from the vacuum system and mounted to dip the convex surface thereof into the molten $CsI_3$ salt 11, avoiding any electrical contact between the cup 3 and the salt 11. A D.C. current of about 70 ma. from a 45 volt battery was passed through the electrolytic salt bath for about 5 minutes, with the bath polarized positively with respect to the mass 1a. In this process, which is the second step in FIG. 1, the $Cs^+$ ions migrated from the $CsI_3$ melt into the zeolite lattice to replace the $Na^+$ ions that had been removed. About $1.7 \times 10^{22}$ $Cs^+$ ions/cm.$^3$ of zeolite material were involved in the migration process, indicating that substantially all of the sodium ions had been replaced by cesium ions, and that the excess Cs had found accommodations either as guests in the large voids in the zeolitic structure or at the external surface of the material. The resulting cesium zeolite is represented by the formula $Cs_{12}(AlO_2)_{12}(SiO_2)_{12}$, which is similar in form to that of the sodium zeolite A, without the water of crystallization that has been driven off.

For testing, the cesium zeolite body, prepared as above, was reinstalled in the vacuum system 6 with the collector ring 7 and an additional electrode 13 in the form of a tungsten heater strip mounted near the zeolite body and collector. The purpose of the heater strip 13 was to collect and contact ionize any neutral Cs atoms evaporating from the zeolite body, for measuring neutral emission. First, the excess atomic cesium was removed from the surface and internal cavities by operating the device for four hours at about 1100° C., with no collector voltage to minimize ion emission. Then, the collector voltage was applied and the ion emission was measured. During the first 20 days, the temperature of the ion source was held at about 1060° C. and the ion current density obtained was initially .65 ma./cm.$^2$, decaying with a time constant of 60 hours. Current densities of 2 ma./cm.$^2$ were obtained at higher temperatures for short periods. During the following 6 days, the temperature was gradually raised to 1250° C., in order to completely exhaust the source of $Cs^+$ ions. From the ion current integrated over time, the capacity of the ion source was found to be $1.2 \times 10^{22}$ $Cs^+$ ions/cm.$^3$ of the source material. In comparison with the $Na^+$ ion density in the original Na zeolite, this indicates that the purity of the synthetic cesium zeolite is close to 100%. Several neutral emission tests made during the useful life of the ion source indicated that neutral emission was very low, amounting to less than 5% of the ion emission.

In preparing ion sources by the present method for use in vapor type discharge devices, the testing step described above may be omitted or modified. After the injection of the cesium ions, the ion source may be merely heated to remove excess cesium, and then mounted in a discharge device to emit cesium ions when heated during operation of the device (the third and fourth steps in FIG. 1).

The synthetic sodium zeolite type A is preferred for use because the number of $Na^+$ cations is equal the number of $SiO_2$ groups. This results in the maximum number of cesium ions that can be injected into the zeolite lattice. However, the method can also be practiced with one of the other zeolites as the starting material. Most of the zeolites can be represented by the general formula $$R_2O.Al_2O_3.nSiO_2.mH_2O$$

where $R_2$ represents either two monovalent metal ions such as $Na^+$, or one divalent metal ion, such as $Ca^{++}$. Sodium zeolite A can be written in the general form as $Na_2O.Al_2O_3.2SiO_2.mH_2O$. Some of the natural zeolites that can be used as the starting material in the process described herein are:

Natrolite, $Na_2O.Al_2O_3.3SiO_2.2H_2O$
Analcime, $Na_2O.Al_2O_3.4SiO_2.2H_2O$
Chabazite, $(Na_2Ca)O.Al_2O_3.4SiO_2.6H_2O$
Thomsonite, $Na_2O.4CaO.5Al_2O_3.10SiO_2.6H_2O$
Laumontite, $CaO.Al_2O_3.4SiO_2.4H_2O$
Scolecite, $CaO.Al_2O_3.3SiO_2.3H_2O$
Edingtonite, $BaO.Al_2O_3.3SiO_2.4H_2O$ In using these zeolites in the present process the $Na^+$ or other cations are thermionically emitted and replaced by $Cs^+$ ions, for example, to form a corresponding Cs zeolite. In most cases, due to the larger relative amounts of silicon present, the cesium zeolite formed contains fewer $Cs^+$ ions/cm.$^3$ of the material, and hence ion emitters of these materials usually have somewhat lower ion capacity than those formed from sodium zeolite A. An exception is Thomsonite in which the total number of valence bonds of Na+ and Ca++ ions replaceable with Cs+ bonds is equal to the number of SiO₂ groups. Moreover, the natural zeolites usually contain a substantial proportion of impurities which affect the purity of the final product.

What is claimed is:

1. The method of making a metal zeolite of high purity comprising the steps of:
   (a) removing substantially all of the mobile cations from a body of zeolite by thermionic emission; and
   (b) then injecting sufficient ions of a metal selected from groups I and II of the Periodic Table into said body to replace substantially all of the cations removed therefrom.

2. The method of making a metal zeolite of high purity, comprising the steps of:
   (a) maintaining a body of sintered zeolite at a temperature of 1000 to 1200° C. in a vacuum for a time sufficient to remove substantially all of the mobile cations from said body by thermionic emission; and
   (b) then injecting sufficient ions of a metal selected from groups I and II of the Periodic Table into said body to replace substantially all of the cations removed therefrom.

3. The method of claim 2, wherein said zeolite is a synthetic sodium zeolite represented by the formula $$Na_{12}(AlO_2)_{12}(SiO_2)_{12}$$

4. The method of making a metal zeolite of high purity, comprising the steps of:
   (a) removing substantially all of the mobile cations from a body of zeolite by thermionic emission; and
   (b) then injecting sufficient ions of a metal selected from groups I and II of the Periodic Table into said body to replace substantially all of the cations removed therefrom by a process of electrolytic migration of ions of the selected metal from a molten salt of that metal.

5. The method of making a cesium zeolite of high purity, comprising the steps of:
   (a) removing substantially all of the mobile cations from a body of zeolite by thermionic emission; and
   (b) then injecting sufficient cesium ions into said body to replace substantially all of the cations removed therefrom.

6. The method of making a cesium zeolite of high purity, comprising the steps of:
   (a) removing substantially all of the mobile cations from a body of zeolite by thermionic emission; and
   (b) then injecting sufficient cesium ions into said body to replace substantially all of the cations removed therefrom, by a process of electrolytic migration of cesium ions from a molten cesium salt.

7. The method of claim 6, wherein said cesium salt is cesium tri-iodide.

8. The method of making a cesium zeolite of high purity, comprising the steps of:
   (a) removing substantially all of the sodium ions from a body of sodium zeolite by thermionic emission; and
   (b) then injecting sufficient cesium ions into mid body to replace substantially all of the sodium ions removed therefrom.

9. The method of making a cesium zeolite of high purity, comprising the steps of:
   (a) removing substantially all of the sodium ions from a body of sodium zeolite by thermionic emission; and
   (b) then injecting sufficient cesium ions into said body to replace substantially all of the sodium ions removed therefrom, by a process of electrolytic migration of cesium ions from a molten cesium salt.

10. The method of claim 9, wherein said cesium salt is cesium tri-iodide.

11. The method of claim 9, wherein said sodium zeolite is a synthetic sodium zeolite represented by the formula $Na_{12}(AlO_2)_{12}(SiO_2)_{12}$.

12. The method of making a cesium zeolite ion emitter of high purity, comprising the steps of:
   (a) maintaining a body of sintered sodium zeolite represented by the formula $Na_{12}(AlO_2)_{12}(SiO_2)_{12}$ at temperature of about 1075° C. in a vacuum for a time sufficient to remove substantially all of the sodium ions by thermionic emission; and
   (b) then injecting sufficient cesium ions into said body to replace substantially all of the sodium atoms removed therefrom, by electrolytic migration of cesium ions from molten cesium tri-iodide.

13. A thermionic cesium ion emitter produced by the method of claim 1 consisting essentially of substantially pure synthetic cesium zeolite represented by the formula $Cs_{12}(AlO_2)_{12}(SiO_2)_{12}$ and having an ion capacity of about $10^{22}$ cesium ions/cm.³ of the emitter material.

14. A thermionic cesium ion emitter as in claim 13, having a neutral cesium emission less than 5% of the ion emission.

References Cited

UNITED STATES PATENTS 3,033,641    5/1962    Thomas _____ 23—112 X

OTHER REFERENCES

Barrer et al., "Jr. Chemical Society," 1953, pages 4029–4035.

Breck et al., "Jr. American Chemical Society," vol. 78, 1956, pages 5963–5971.

EDWARD J. MEROS, *Primary Examiner.*